(12) United States Patent
Jung et al.

(10) Patent No.: US 10,899,642 B2
(45) Date of Patent: Jan. 26, 2021

(54) WASTEWATER TREATMENT APPARATUS FOR SHORTCUT NITROGEN REMOVAL USING ANAEROBIC AMMONIUM OXIDATION AND PARTIAL NITRITATION USING AMMONIUM OXIDIZING BACTERIA GRANULES

(71) Applicant: BKT CO., LTD., Daejeon (KR)

(72) Inventors: Min Ki Jung, Daejeon (KR); Dae Hwan Rhu, Yeoju-si (KR); Hong Keun Park, Mokpo-si (KR); Dong Woo Kim, Yoba Linda, CA (US); Dong Jin Ju, Sejong (KR)

( * ) Notice: Subject to any disclaimer, the term of this patent is extended or adjusted under 35 U.S.C. 154(b) by 0 days.

(21) Appl. No.: 16/486,159

(22) PCT Filed: Dec. 26, 2017

(86) PCT No.: PCT/KR2017/015452
§ 371 (c)(1),
(2) Date: Aug. 15, 2019

(87) PCT Pub. No.: WO2018/155802
PCT Pub. Date: Aug. 30, 2018

(65) Prior Publication Data
US 2020/0031701 A1  Jan. 30, 2020

(30) Foreign Application Priority Data
Feb. 23, 2017  (KR) .................. 10-2017-0024256

(51) Int. Cl.
*C02F 9/00*  (2006.01)
*C02F 1/24*  (2006.01)
(Continued)

(52) U.S. Cl.
CPC .............. *C02F 3/307* (2013.01); *C02F 9/00* (2013.01); *C02F 1/24* (2013.01); *C02F 3/223* (2013.01);
(Continued)

(58) Field of Classification Search
CPC .......... C02F 3/302; C02F 3/301; C02F 3/348; C02F 2101/16; C02F 3/30; C02F 3/307;
(Continued)

(56) References Cited

U.S. PATENT DOCUMENTS

2013/0256217 A1  10/2013  Lemaire et al.
2013/0264280 A1*  10/2013  Zhao ................. C02F 3/348
                                                      210/605
2017/0291839 A1*  10/2017  Christensson .......... C02F 11/04

FOREIGN PATENT DOCUMENTS

JP      2007-136366      6/2007
JP         4835536       10/2011
(Continued)

OTHER PUBLICATIONS

Lee, KR 20140053463, English Machine translation, p. 1 (Year: 2014).*

(Continued)

*Primary Examiner* — Claire A Norris
(74) *Attorney, Agent, or Firm* — Antonio Ha & U.S. Patent, LLC

(57) ABSTRACT

The present invention relates to a wastewater treatment apparatus for shortcut nitrogen removal using anaerobic ammonium oxidation (ANAMMOX) and partial nitritation using ammonium oxidizing bacteria (AOB) granules. High-purity AOB granules are formed by means of AOB predominance using a side stream generated during a sludge treatment process. Moreover, the formed AOB granules are supplied to a partial nitritation tank (130) of a main treat- (Continued)

ment process and thus the partial nitritation is efficiently performed and nitrogen is quickly removed, and thus oxygen and an organic material is reduced compared to an existing method.

9 Claims, 8 Drawing Sheets

(51) Int. Cl.
*C02F 3/28* (2006.01)
*C02F 3/30* (2006.01)
C02F 3/34 (2006.01)
C02F 3/22 (2006.01)
C02F 11/04 (2006.01)
C02F 11/12 (2019.01)
C02F 1/00 (2006.01)

(52) U.S. Cl.
CPC ............ *C02F 3/2833* (2013.01); *C02F 3/303* (2013.01); *C02F 3/341* (2013.01); *C02F 11/04* (2013.01); *C02F 11/12* (2013.01); *C02F 2001/007* (2013.01); *C02F 2203/004* (2013.01)

(58) Field of Classification Search
CPC .. C02F 3/12; C02F 3/303; C02F 3/305; C02F 2203/004; C02F 3/121; C02F 9/00; C02F 2001/001
USPC .................. 210/601, 615, 611, 620, 613, 630
See application file for complete search history.

(56) References Cited

FOREIGN PATENT DOCUMENTS

| KR | 10-2004-0042229 | 5/2004 |
| KR | 10-0446577 | 9/2004 |
| KR | 10-0586535 | 6/2006 |
| KR | 10-2007-0002382 | 1/2007 |
| KR | 100719434 B1 * | 5/2007 |
| KR | 10-0980464 | 7/2010 |
| KR | 20140053463 A * | 5/2014 |
| KR | 10-1691439 | 12/2016 |

OTHER PUBLICATIONS

Hwang, KR100719434, English Machine Translation, pp. 1-3 (Year: 2007).*
Kim et al, KR2004004229, English Machine Tranlsation, pp. 1-9 (Year: 2004).*
Taku Sato et al, JP2007136366, English Machine Translation, pp. 1-9 (Year: 2007).*
English Specification of 2007-136366.
English Specification of 10-0980464.
English Specification of 10-2004-0042229.
English Specification of 4835536.
English Specification of 10-0586535.
English Specification of 10-0446577.
English Specification of 10-1691439.
English Specification of 10-2007-0002382.

* cited by examiner

WASTEWATER TREATMENT APPARATUS FOR SHORTCUT NITROGEN REMOVAL USING ANAEROBIC AMMONIUM OXIDATION AND PARTIAL NITRITATION USING AMMONIUM OXIDIZING BACTERIA GRANULES

TECHNICAL FIELD

The present invention relates to an apparatus of processing nitrogen-containing wastewater using ammonium oxidation bacteria (AOB) granules (hereinafter, "AOB granules") and anaerobic ammonium oxidation (ANAMMOX) process (hereinafter, "ANAMMOX process").

More specifically, the present invention relates to a wastewater treatment apparatus capable of quickly and economically removing nitrogen even without an external carbon source using an ANAMMOX process while simultaneously performing partial nitritation in an efficient manner by forming AOB granules using a side stream produced in a sludge treatment process and supplying the formed AOB granules to a partial nitritation tank of a main treatment process.

BACKGROUND ART

Wastewater contains various contaminants including nitrogen, phosphor, or other nutritive salts as well as solids and organic matter.

Such contaminants may be removed by physical, chemical, and biological methods. Among such processes, biological active sludge processes remove contaminants using bacteria and, by their economic and efficient nature, are being widely adopted in industry.

Wastewater from homes or businesses contains ammonia, ammonium compounds, nitrite compounds, nitrate compounds, or other inorganic nitrogen or amino acids, proteins, or other organic nitrogen.

Nitrogen-containing wastewater may cause eutrophication and dissolved oxygen deficiency which may deteriorate water quality and its discharge in public water areas is being regulated based on predetermined standards. Wastewater treatment particularly on nitrogen wastewater is primarily performed in large-scale businesses or wastewater treatment facilities.

FIG. 1 is a view illustrating a conventional nitrogen treatment process.

Referring to FIG. 1, in a treatment process for removing nitrogen in a biological manner, a water treatment processing part uses a denitrification (anaerobic condition) or nitrification (aerobic condition) reaction tank which is a bioreaction tank.

Nitrogen components of wastewater exist mostly in the form of ammonia nitrogen and, thus, the conventional nitrogen wastewater biological treatment mainly adopts a combination of a nitrification and denitrification.

Nitrification transforms ammonia nitrogen into nitrite nitrogen and transforms nitrite nitrogen into nitrate nitrogen under an aerobic condition using oxidation of digestion bacterial, e.g., *Nitrosomonas* or *Nitrobacter*. Denitrification which follows transforms nitrate nitrogen into a harmless nitrogen gas under an anaerobic (or oxygen-free) condition using deoxidation of denitrification bacteria such as *pseudomonas*, thereby eliminating nitrogen.

Nitrogen contained in wastewater is removed while undergoing a biological reaction which consists of several steps.

As shown in Reaction Formula 1, as air is supplied to ammonia nitrogen which is in reduced state, nitrogen is oxidized.

$$NH_4^+ + 1.5O_2 \rightarrow NO_2^- + 2H^+ + H_2O$$

$$NO_2^- + 0.5O_2 \rightarrow NO_3^-$$

$$NH_4^+ + 2O_2 \rightarrow NO_3^- + 2H^+ + H_2O \qquad \text{<Reaction Formula 1>}$$

As shown in Reaction Formula 1, 3.43 mg of oxygen is needed to oxidize 1 mg of ammonia nitrogen into nitrite nitrogen, and 1.14 mg of oxygen is additionally required to oxidize 1 mg of nitrite nitrogen into nitrate nitrogen. Resultantly, 4.57 mg of oxygen is consumed to oxidize 1 mg of ammonia nitrogen into nitrate nitrogen.

In other words, given that the nitrogen concentration in wastewater is about 40 to 50 mg/L, the amount of oxygen necessary for oxidizing nitrogen in wastewater is 182.8 to 228.5 mg/L which is larger than the amount of oxygen needed for oxidizing organic matter and may be the cause of raising costs in operating wastewater treatment facility.

As shown in Reaction Formula 2, oxidized nitrate nitrogen is discharged as nitrogen gas into the air and hence removed.

$$NO_3^- + 1.08CH_3OH + 0.24H_2CO_3 \rightarrow 0.06C_5H_7O_2N + 0.47N_2 + 1.68H_2O + HCO_3^- \qquad \text{<Reaction Formula 2>}$$

As such, biological nitrogen removal requires a significant amount of oxygen and organic matter and, as mentioned above, this may increase operation costs of wastewater treatment facilities.

Meanwhile, sludge is produced in the biological nitrogen removal process. Sludge is treated generally in concentration, anaerobic digestion and dehydration processes and the resultant leachate is treated by a water treatment process.

Although a tiny amount of side stream, e.g., 1 to 2% of the influent flow, is produced in the process of treating sludge including leachate, nitrogen and phosphor loads are 10 to 20% of the influent loads which is very high. Thus, a need exists for proper treatment.

Efforts are recently being made to save energy and reduce carbon dioxide emissions to prevent global warming. For the same purpose in wastewater treatment, there are vigorous ongoing research efforts. Among others, intensive research is underway for producing methane, which is a useful energy source, using organic matter present in wastewater.

Methane production may be maximized by introducing as much organic matter present in wastewater as possible and using microorganisms for acidogenesis and methane fermentation in an anaerobic state.

To this end, a coagulant may be injected into the first sedimentation tank or a filtering process with excellent solid removal effects may be introduced. However, such a process cause insufficiency in the carbon source necessary for the nitrogen removal process and may increase nitrogen loads by the side stream.

To address such issues, short-cut nitrogen removal processes have been developed. Short-cut nitrogen removal processes oxidize only half of ammonia nitrogen only up to the nitritation ($NO_2^-$) step and then use the remaining ammonia nitrogen as an electron donor to thereby remove nitrogen.

As compared with the conventional processes, short-cut nitrogen removal processes are very economical in light that they can save oxygen by 60% and organic matter by 100%.

ANAMMOX is the action of particular microorganisms. ANAMMOX uses nitrite nitrogen as an electron donor under an anaerobic condition, thereby transforming ammonia nitrogen into nitrogen gas. Such transformation is represented as Reaction Formula 3.

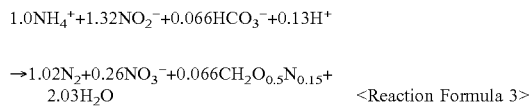

$$1.0NH_4^+ + 1.32NO_2^- + 0.066HCO_3^- + 0.13H^+$$
$$\rightarrow 1.02N_2 + 0.26NO_3^- + 0.066CH_2O_{0.5}N_{0.15} + 2.03H_2O \quad \text{<Reaction Formula 3>}$$

As shown in Reaction Formula 3, nitrite nitrogen is used as an electron acceptor. Thus, the partial nitration process which oxidizes part (half) of ammonia nitrogen in wastewater into nitrite nitrogen should be positioned upstream of the short-cut nitrogen removal process.

What matters most in adopting a short-cut nitrogen removal process as the main treatment process is to achieve stable partial nitration. The concentration of ammonia nitrogen in the side stream which is produced as a sludge treatment process is performed in the anaerobic digestion tank is 500 mg/L to 1,500 mg/L which is a little high, and the temperature is 25° C. or higher and, thus, nitration may easily be achieved.

Under such conditions, AOB grows faster than nitrite oxidation bacteria (NOB) and, thus, AOB may take dominance.

In the main treatment process, however, the dominance of AOB is not easy due to its low concentration which is 30 mg/L to 50 mg/L and low water temperature which is 15° C.

Thus, due to failure in stable nitration, it may be hard to secure nitrous acid which is necessary for the short-cut nitrogen removal process.

The following method shows how AOB take dominance over NOB. Since the doubling time of NOB is 1 day or longer, solids are configured to have a retention time of one day or less. In other words, as the solid retention time (SRT) is operated to be one day or less, AOB remain in the apparatus, and NOB are washed out. Thus, AOB may take dominance.

As described above, as the SRT is operated to be one day or less, NOB may be washed out. However, organic matter is contained in influent wastewater, and a process for removing organic matter is performed also. Thus, the operation of the apparatus to allow AOB to be dominance may cause a good deal of heterotrophic microorganisms to be dominance. As such, AOB dominance for nitration in the existing reaction tank is not easy in a technical point of view.

Further, since the doubling time of heterotrophic microorganisms which remove organic matter is very short, 0.17 days, although the SRT is operated to be one day, the heterotrophic microorganisms end up being dominance.

Thus, the AOB dominance issue for achieving partial nitration in the wastewater main treatment process needs to be addressed. To that end, an ANAMMOX process-based short-cut nitrogen removal process may be applied to the main treatment process.

The ANAMMOX process is performed by known microorganisms. ANAMMOX microorganisms which take a short-cut nitrogen removal reaction are very slow in growth, and their doubling time is very long, e.g., 11 days. In other words, a reaction tank where microorganisms are not washed out needs to be applied to the process in order to stably secure microorganisms.

As prior art documents related to the background technology of the present invention, there are U.S. Patent Application Publication No. 2013-0256217 (published on Oct. 3, 2013, hereinafter, "prior document 1"), Japanese Patent No. 4835536 (published on Dec. 14, 2011, hereinafter, "prior document 2"), Korean Patent No. 10-0586535 (published on Jun. 8, 2006, hereinafter, "prior document 3"), and Korean Patent No. 10-0446577 (published on Sep. 4, 2004, hereinafter, "prior document 4").

Prior document 1 relates to a method and apparatus of controlling aeration in water nitrification and denitrification and discloses processing ammonium-containing water using a biological reactor.

The invention disclosed in prior document 1 forms a biofilm and simultaneously performs nitrification and denitrification. However, where the biofilm is damaged, it takes long time to recover to the normal state, and excessive growth of microorganisms blocks the space between media, thus deteriorating processing efficiency.

Prior document 2 relates to a method of removing organic matter and nitrogen from a treated liquid and discloses a method of removing organic matter and nitrogen from an anaerobic treatment tank using autotrophic denitrifiers and anaerobic treatment by methane fermentation.

The invention disclosed in prior document 2 uses granules but is silent as to production of granules. Further, the need for continuous feeding of external carbon sources for methane fermentation adds a financial burden.

Prior document 3 relates to an advanced treatment system and method for wastewater using a nitrifying bacteria granulation reactor and discloses a method of denitrifying wastewater by intermittently introducing nitrifying bacteria granules.

Prior document 4 relates to a method of removing nitrogen using nitrifying bacteria granules and discloses a method of producing nitrifying bacteria granules focusing on ammonia oxidizing bacteria and removing nitrogen from wastewater.

The inventions disclosed in prior documents 3 and 4 increase nitration and nitrification in the main reaction tank by supplying nitrite oxidizing bacteria and nitrate oxidizing bacteria to the main reaction tank but remove organic matter from the influent water while undergoing an aerobic state. Thus, organic matter flowing into the denitrification tank are removed. Thus, denitrification requires injection of external carbon sources.

The inventions disclosed in prior documents 3 and 4 use methanol and acetic acid as external carbon sources and thus do not live up to large-scale treatment facilities requiring a great quantity of external carbon sources.

Further, since heterotrophic microorganisms, which remove organic matter, including denitrifying microorganisms grow several times faster than AOB, the dominance of AOB is impossible in practice.

In particular, heterotrophic microorganisms in sludge flowing into the granule reaction tank have already been dominated and, thus, it may take long for nitration microorganisms to dominate the granulation tank.

Thus, the present invention uses an AOB granulation tank which includes an airlift-type reactor using a sludge treating side stream containing high-concentration nitrogen, thereby performing partial nitration on the side stream and producing AOB granules while simultaneously supplying the AOB granules to the partial nitration reaction tank.

The present invention carries back good, high-settleability ones among granules discharged from the partial nitration reaction tank back to the partial nitration reaction tank and introduce low-settleability granules which result from the release of granules to the AOB granulation tank to thereby reproduce and resupply granules. The ANAMMOX process of the present invention removes nitrogen from wastewater which has undergone partial nitration without consuming organic matter. In other words, the present invention provides a short-cut nitrogen removal process wastewater treatment apparatus using partial nitritation using AOB granules and an ANAMMOX process.

PRIOR ART DOCUMENTS (Prior document 1) U. S. Patent Application Publication No. 2013-0256217 (published on Oct. 3, 2013)
(Prior document 2) Japanese Patent No. 4835536 (published on Dec. 14, 2011)
(Prior document 3) Korean Patent No. 10-0586535 (published on Jun. 8, 2006)
(Prior document 4) Korean Patent No. 10-0446577 (published on Sep. 4, 2004)

DETAILED DESCRIPTION OF THE INVENTION

Technical Problem

The present invention aims to provide a short-cut nitrogen removal process wastewater treatment apparatus which uses an ANAMMOX process to remove nitrogen without consuming organic matter and partial nitritation using AOB granules by installing an AOB granulation tank, which uses a side stream, in a sludge treating part, an ANAMMOX reaction tank, a granule recovery tank, and a partial nitritation reaction tank added to a main treatment processing part of a wastewater treatment apparatus.

The present invention aims to stably securing AOB and stably achieve partial nitritation by applying a short-cut nitrogen removal process which is a combination of partial nitritation and an ANAMMOX process to the wastewater main treatment process, thereby removing nitrogen using the stabilized short-cut nitrogen removal reaction in the main treatment process.

The present invention aims to achieve stabilized partial nitritation by recovering AOB granules from the granule recovery tank and supplying the AOB granules.

The present invention aims to prevent leakage of ANAMMOX microorganisms from the ANAMMOX reaction tank and securing a concentration for suspended solids (SS) in the discharged water.

The present invention aims to recover granules produced in the AOB granulation tank, store the recovered granules in a storage tank, and resupply the granules.

The present invention aims to process a side stream in the ANAMMOX reaction tank by an ANAMMOX process.

Technical Solution

To achieve the foregoing objectives, the present invention provides a wastewater treatment apparatus of short-cut nitrogen removal process using an ANAMMOX process and partial nitritation using AOB granules, which is characterized in that the main treatment processing part of the wastewater treatment apparatus adds a partial nitritation reaction tank, a granule recovery tank, an ANAMMOX reaction tank, and an AOB granulation tank.

The present invention is characterized by recovering poor, low-settleability granules from the granule recovery tank, reintroducing the poor granules back to the AOB granulation tank to reproduce the poor granules into good, high-purity AOB granules, and resupplying the reproduced AOB granules, thereby enabling stabilized partial nitritation.

The present invention is characterized in that the ANAMMOX reaction tank is operated in an upflow and fluidized bed through a sludge granule or biofilm process, and that an upper portion of the ANAMMOX reaction tank is filled with floating media to prevent leakage of ANAMMOX microorganisms and to secure a concentration for suspended solids in the discharged water.

The present invention is characterized in that granules produced in the AOB granulation tank are recovered and stored in a storage tank, and the granules are supplied when the partial nitritation reaction tank added to the main treatment processing part goes through low efficiency.

The present invention provides a wastewater treatment apparatus characterized in that the ANAMMOX reaction tank includes any one of a completed mixed or moving bed biofilm process.

Advantageous Effects

According to the present invention, the wastewater treatment apparatus of short-cut nitrogen removal process using an ANAMMOX process and partial nitritation using AOB granules may stably achieve partial nitritation using a short-cut nitrogen removal process by combining partial nitritation and an ANAMMOX process.

The present invention has an effect of saving 100% of organic matter and 60% of oxygen as compared with the prior art by using a short-cut nitrogen removal process which oxidizes only half of ammonia nitrogen up into nitrite and removes nitrogen by a denitrifying reaction.

The present invention may stably produce high-purity AOB granules using a side stream and sludge in which AOB are dominance and resupplying the AOB granules to the partial nitritation reaction tank, which is added to the main treatment process to stably secure AOB granules in the partial nitritation reaction tank, thereby allowing AOB to dominate more quickly than NOB and hence rapidly processing wastewater.

Further, the present invention may recover AOB granules which have been supplied to the side stream and reuse them several times, but not just one time.

DESCRIPTION OF REFERENCE CHARACTERS

Figure 1:
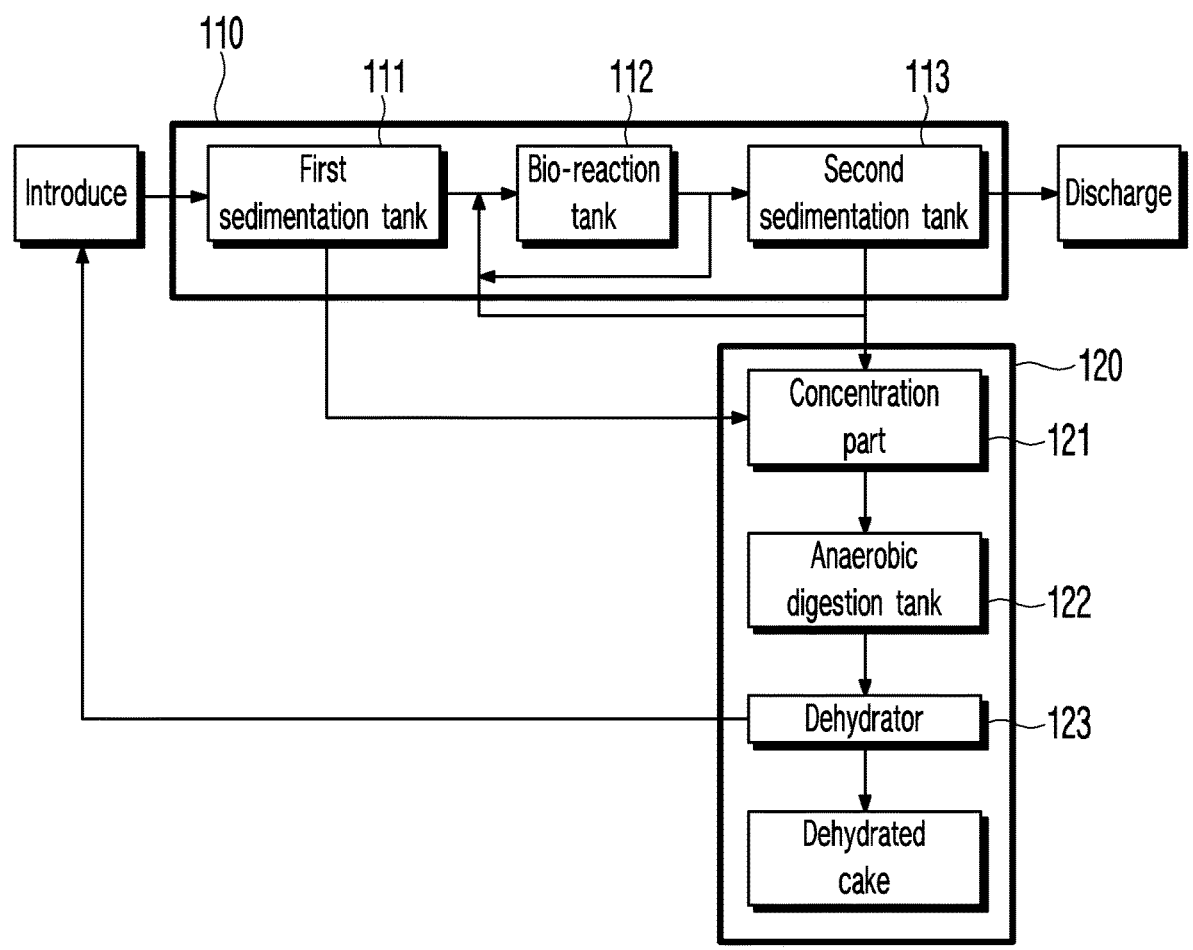
FIG. 1 is a view illustrating a conventional nitrogen treatment process.

110: main treatment processing part
111: first sedimentation tank
112: bio-reaction tank
113: second sedimentation tank
120: sludge treatment processing part
121: concentration part
122: anaerobic digestion tank
123: dehydrator
130: partial nitrification reaction tank
140: granule recovery tank
150: ANAMMOX reaction tank
160: AOB granulation tank
170: ANAMMOX reaction tank

MODE FOR CARRYING OUT THE INVENTION

Hereinafter, the present invention is described in detail with reference to embodiments thereof. The present invention is not limited to embodiments set forth herein but may rather be embodied in other various forms. The embodiments set forth herein are provided to fully convey the spirit of the present invention to one of ordinary skill in the art to which the present invention pertains. Thus, the present invention should not be limited by the following embodiments and it should be appreciated that all modifications, equivalents, or replacements which belong to the technical spirit and scope of the present invention are included.

Various changes may be made to the present invention, and the present invention may come with a diversity of embodiments. Some embodiments of the present invention are shown and described in connection with the drawings. Relative sizes between the components in the drawings may be slightly exaggerated for a clear understanding of the present invention. Slight changes may also be made to the shape of the components in the drawings due to, e.g., variations in manufacturing process. Thus, unless explicitly stated otherwise, the embodiments set forth herein should not be limited to the shapes shown in the drawings and it should be appreciated that some changes may be made thereto.

Meanwhile, various embodiments of the present invention may be combined with any other embodiments unless indicated otherwise. In particular, some features indicated as preferable or advantageous may be combined with other features indicated as preferable or advantageous.

When determined to make the subject matter of the present invention unclear, the detailed description of the known art or functions may be skipped.

Embodiment 1. Wastewater Treatment Apparatus

Figure 2:
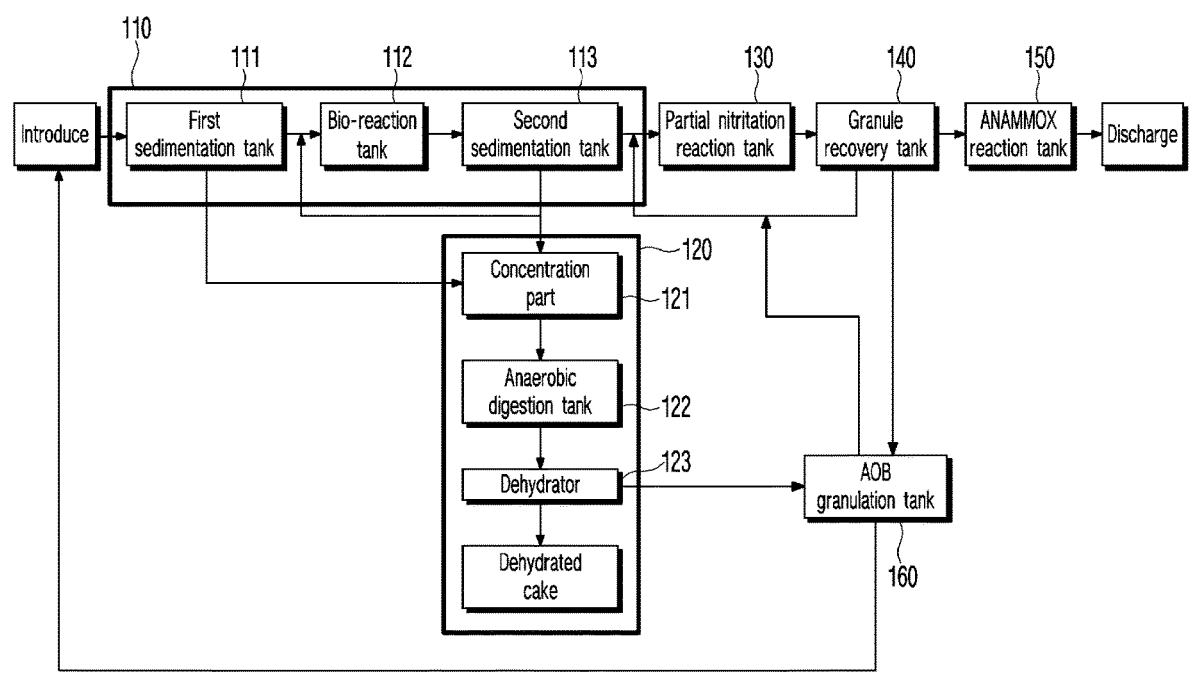
FIG. 2 is a view illustrating a short-cut nitrogen removal process in a main treatment process according to an embodiment of the present invention.

FIG. 2 is a view illustrating a short-cut nitrogen removal process in a main treatment process according to an embodiment of the present invention;

The wastewater treatment apparatus includes a main treatment processing part 110, a sludge treatment processing part 120, a partial nitritation reaction tank 130, a granule recovery tank 140, an ANAMMOX reaction tank 150, and an AOB granulation tank 160. However, the present invention is not limited thereto.

The main treatment processing part 110 includes, but is not limited to, a first sedimentation tank 111 for removing particulate organic matter of wastewater, a bio-reaction tank 112 for removing dissolved organic matter of the first sedimented wastewater, and a second sedimentation tank 113 for solid-liquid separating the organic matter-removed wastewater.

The main treatment processing part 110 may further include, but is not limited to, the partial nitritation reaction tank 130, the granule recovery tank 140, and the ANAMMOX reaction tank 150.

The sludge treatment processing part 120 includes, but is not limited to, a concentrating part 121 to concentrate the solids separated in the first and second sedimentation tanks, an anaerobic digestion tank 122 to anaerobically digest the concentrated solids, and a dehydrator 123 to solid-liquid separate the solids anaerobically digested.

The sludge treatment processing part 120 may further include, but is not limited to, the AOB granulation tank 160.

The wastewater goes through partial nitritation in the partial nitritation reaction tank 130.

The partial nitritation reaction tank 130 measures 2 m horizontally, 2 m in length, and 2.5 m in effective depth of water and may be made a block whose effective volume is 10 m$^3$. The partial nitritation reaction tank 130 may be operated in continuous flow and completed mixed forms but is not limited thereby.

The wastewater which has undergone partial nitritation is introduced into the granule recovery tank 140.

The granule recovery tank 140 may recover AOB granules discharged along with the wastewater.

The granule recovery tank 140 includes a granule recovering part, preferably two granule recovering parts, but not limited to two.

The recovered granules are separated into good granules and poor granules.

The granule recovery tank 140 may allow granules which have a poor condition and low settleability to reenter the AOB granulation tank 160.

Figure 3:
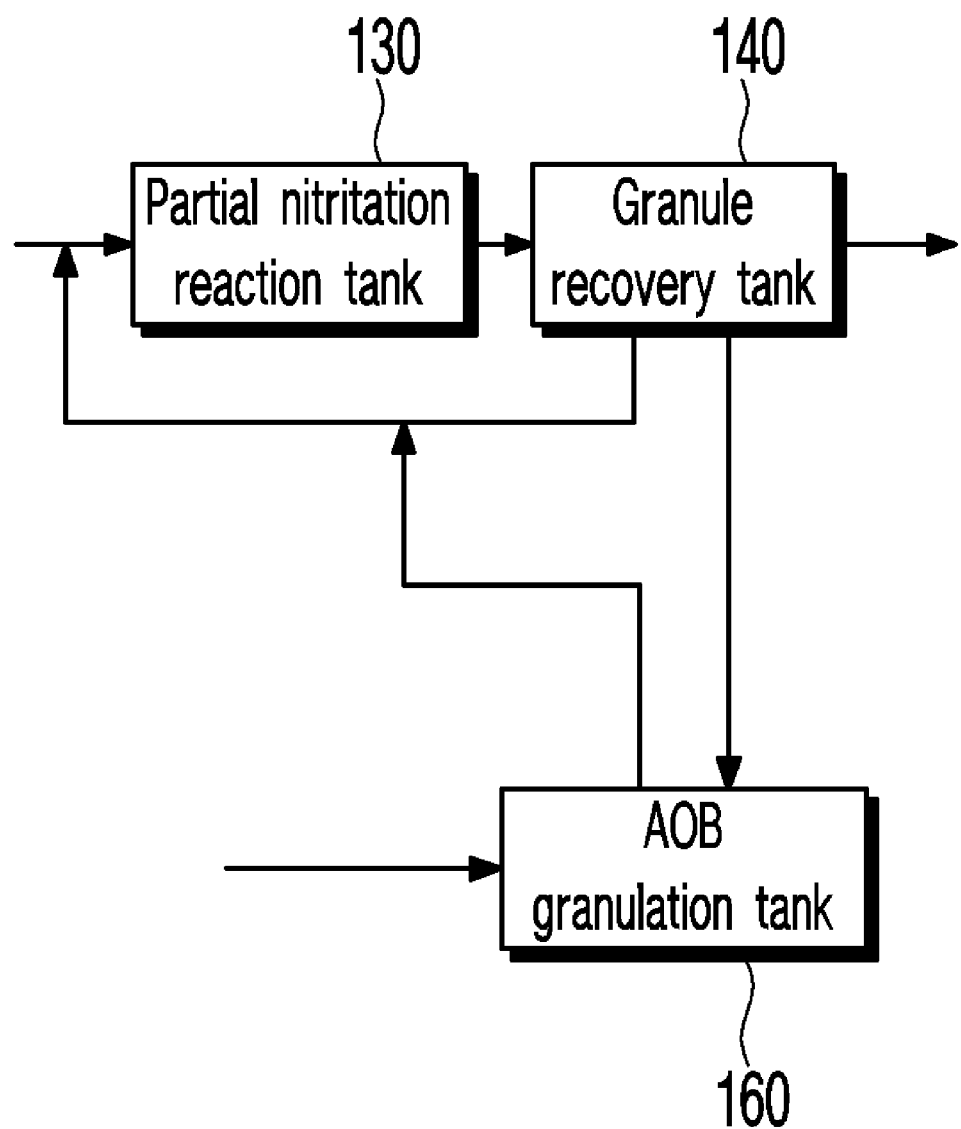
FIG. 3 is a view illustrating a process of returning and recovering granules in a granule recovering tank according to an embodiment of the present invention.

FIG. 3 is a view illustrating a process of returning and recovering granules in a granule recovering tank according to an embodiment of the present invention;

The ANAMMOX reaction tank 150 removes nitrogen in the wastewater, which has undergone partial nitritation, without consuming organic matter. The ANAMMOX reaction tank 150 may include, but is not limited to, any one of a sludge granule process or a biofilm process.

The ANAMMOX reaction tank 150 may be configured as a circular reactor which measures 0.5 m in diameter, 3.7 m in effective depth of water, and 0.72 m$^3$ in effective volume. The ANAMMOX reaction tank 150 may be operated in an upflow and fluidized bed but is not limited thereby.

An upper portion of the ANAMMOX reaction tank 150 may be filled with floating media, thereby preventing loss of ANAMMOX microorganisms and securing a concentration of suspended solids in the discharged water.

The AOB granulation tank 160 performs partial nitritation on the side stream produced in the dehydrator 123 using an airlift-type reactor while simultaneously producing AOB granules.

The AOB granulation tank 160 may reproduce poor granules which have been reentered from the granule recovery tank 140 into good granules, i.e., high-purity AOB granules.

The AOB granulation tank 160 may recover and store the produced AOB granules in a storage tank and, as the efficiency of the partial nitritation reaction tank 130 is lowered, may supply the granules to the partial nitritation reaction tank 130.

The AOB granules produced by the AOB granulation tank 160 are supplied to the partial nitritation reaction tank 130.

MODE FOR CARRYING OUT THE INVENTION

Embodiment 2. Wastewater Treatment Apparatus

Figure 4:
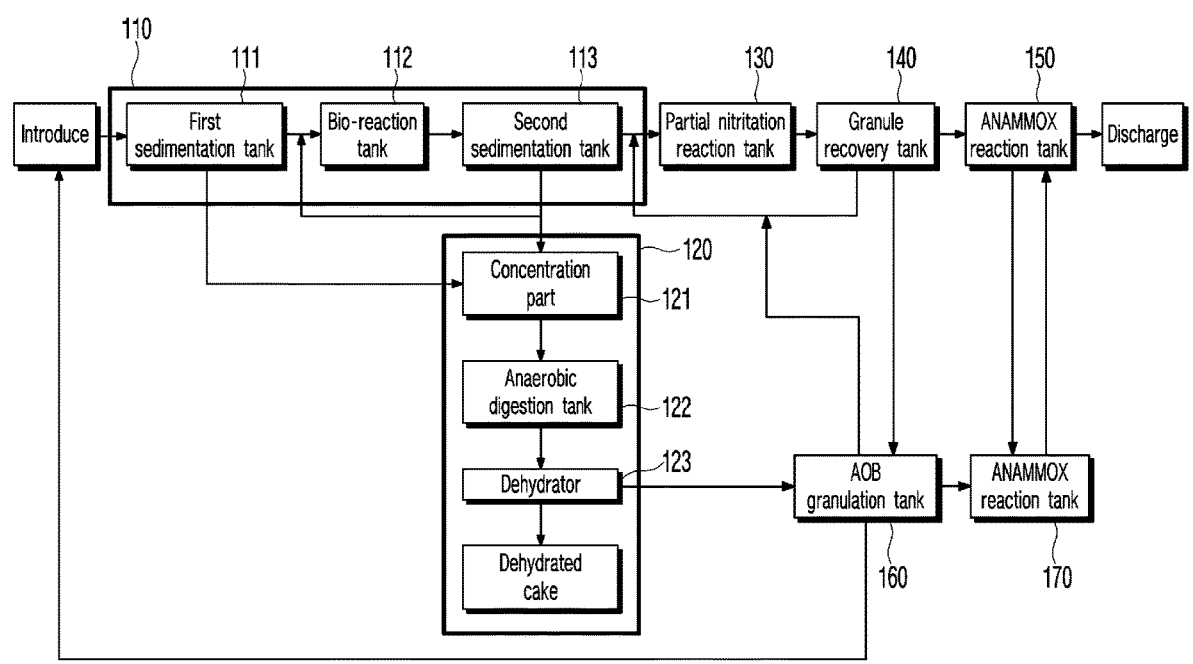
FIG. 4 is a view illustrating a short-cut nitrogen removal process of side stream using an ANAMMOX process and an AOB granulation tank according to an embodiment of the present invention.

FIG. 4 is a view illustrating a short-cut nitrogen removal process of side stream using an ANAMMOX process and an AOB granulation tank according to an embodiment of the present invention;

The wastewater treatment apparatus of <Embodiment 1> includes a main treatment processing part 110, a sludge treatment processing part 120, a partial nitritation reaction tank 130, a granule recovery tank 140, an ANAMMOX reaction tank 150, and an AOB granulation tank 160 and may further include, but is not limited to, an ANAMMOX reaction tank 170.

The sludge treatment processing part 120 may further include, but is not limited to, the ANAMMOX reaction tank 170.

The ANAMMOX reaction tank 170 may include, but is not limited to, any one of a completed mixed or moving bed biofilm process.

In the fluidized bed biofilm process, a fluidized bed carrier formed with a specific gravity of 0.94 to 0.96 and a specific surface area of 500 to 800 $m^2/m^3$ may be put in 40 to 50% of the volume of the ANAMMOX reaction tank 170, but is not limited thereto.

The fluidized bed biofilm process may include, but is not limited to, a stirrer for smooth fluidity of the fluidized bed carrier and a non-powered buoyant discharger for preventing leakage of the carrier and bacteria.

To minimize influence by particulate matter discharged from the dehydrator 123, the ANAMMOX reaction tank 170 includes a flotation-type solid separator, and floating sludge is carried back to the front end of the dehydrator.

To minimize influence by particulate matter flowing out of the airlift-type reactor of the AOB granulation tank 160, a slope plate-type sedimentation tank may be added between the AOB granulation tank 160 and the ANAMMOX reaction tank 170, but without limited thereto.

Embodiment 3. Method of Producing AOB Granules

As an AOB granulation reactor used according to the present invention, a known one was used.

The AOB granulation reactor may include, but is not limited to, a sequencing batch reactor including a stainless reactor shaped as a circular pipe and including an inner circular pipe to form spherical granules by the internal hydraulic shearing force, a pump to inject ammonia-containing wastewater, a motorized valve for discharging treated water, a motorized valve for discharging granules, a blower for supplying air, a chemical pump, and an automatic operation control panel.

The AOB granulation reactor measures 0.86 m in diameter, 3.45 m in effective depth of water, and 2 $m^3$ in effective volume, and the motorized valve for discharging treated water after sedimentation may be installed in the middle of the height of the reactor and the motorized valve for discharging granules may be installed at the bottom of the reactor, but without limited thereto or thereby.

Regarding the amount of air in the AOB granulation reactor, operation may be performed as the adjusting valve is adjusted in a range from 0.01 m/s to 0.2 m/s, and preferably, as it is operated in a range from 0.05 m/s to 0.15 m/s, operation may be performed, but without limited thereto.

The area of the inner circular pipe and outer circular pipe in the reaction tank is set to allow the flow speed of air to be the same in the inner circular pipe and the outer circular pipe, and the area of the upper portion of the reaction tank where a hydraulic shearing force is produced for producing granules is set to be able to reduce the flow speed of air to ¼.

The diameter-to-effective water depth height ratio of the reaction tank is preferably maintained to be minimally 1:3 to 4.

AOB-containing extra sludge is inoculated into the reactor and high-concentration ammonia-containing wastewater is injected to the reactor, thereby performing the operation.

The operation of the reactor repeats the step of injecting ammonia wastewater, the step of nitritation and forming granules, the step of sedimentation, and the step of discharging microorganisms with poor settleability and treated water in the order thereof.

As the influent wastewater, anaerobically digested leachate of first sedimented sludge and second sedimented sludge was used. At this time, operation may be performed until the ammonia concentration of the influent wastewater is 100 to 2,500 mg/L, preferably 500 to 2,000 mg/L, but without limited thereto.

The time taken for introducing wastewater, aeration, sedimentation, and discharge may be varied depending on the concentration of introduced ammonia nitrogen, and three to 24 hours may be consumed for one cycle, but without limited thereto.

Keeping the time of sedimentation short upon operation of the AOB granulation reactor allows a good amount of AOB granules with good settleability to settle in the lower portion of the reactor. However, the AOB granulation reactor fails to form AOB granules, and suspended microorganisms which have low settleability are washed out in the discharging step. If such manipulation is repeated, the AOB granulation reactor selectively exerts pressure, thus forming good-settleability AOB granules and making them dominance species. However, embodiments of the present invention are not limited thereto.

According to the present invention, operation may be performed to allow AOB granules to selectively accumulate while maintaining the sedimentation speed of the sequencing batch reactor to be 10 to 60 m/h, but without limited thereto.

Experimental Example 1: Identify the Characteristic of AOB Granulation in Side Stream An experiment for AOB granulation and partial nitritation was performed in the side stream using the AOB granulation reactor of <Embodiment 3>.

As one cycle, side stream was introduced into the AOB granulation reactor for five minutes, aeration and partial nitritation was performed for 140 to 155 minutes, the AOB granulation reactor was subjected to sedimentation for about 15 minutes to about 30 minutes, and the treated water was discharged for five minutes.

Further, eight cycles were performed for a day, with each cycle taking three hours.

1 m³ of the treated water which is ½ of the volume of the overall reactor was discharged, and the overall retention time was maintained as 6 hours. (The tester) stepwise shortened the sedimentation time depending on the degree of formation and sedimentation of granules and increased aeration time.

The ammonia nitrogen in wastewater used for the experiment was 500 mg/L on the average, and the pH and temperature of the reactor were maintained to be 7.3 to 7.5 and 28±2° C., respectively. Oxygen which was needed for partial nitritation was injected by a diffuser inside the reaction tank, and dissolved oxygen was maintained to be about 2 mg/L or less.

Figure 5:
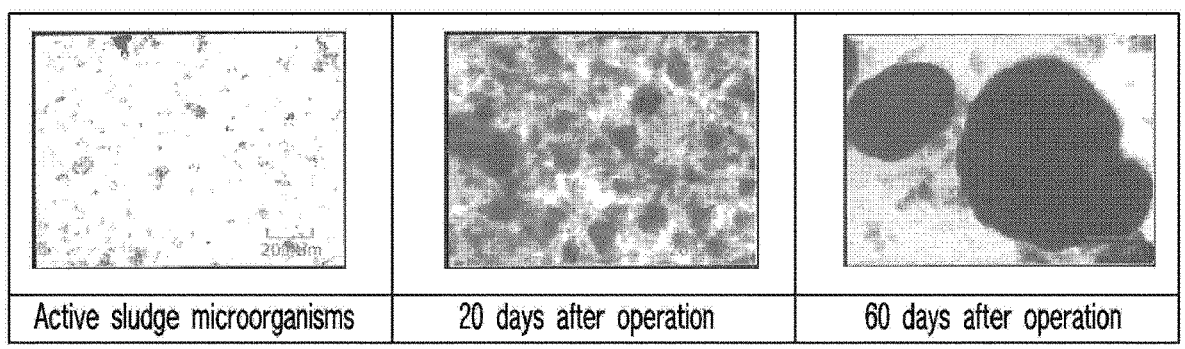
FIG. 5 shows photos for comparing variations in the size of AOB granules over time as an AOB granulation tank is operated according to an embodiment of the present invention.

FIG. 5 shows photos for comparing variations in the size of AOB granules over time as an AOB granulation tank is operated according to an embodiment of the present invention.

Referring to FIG. 5, it can be identified that the size of granules per period in a reactor was observed under a microscope. It can be shown that the size of microorganisms in active sludge is about 10 μm to 50 μm, 20 days after the operation, granules with a size of about 100 μm formed, and 60 days after the operation, the size of granules was increased up to 800 μm to 1,200 μm.

It can be shown that 60 days after in the reactor of <Embodiment 3>, spherical and elliptical granules formed.

Figure 6:
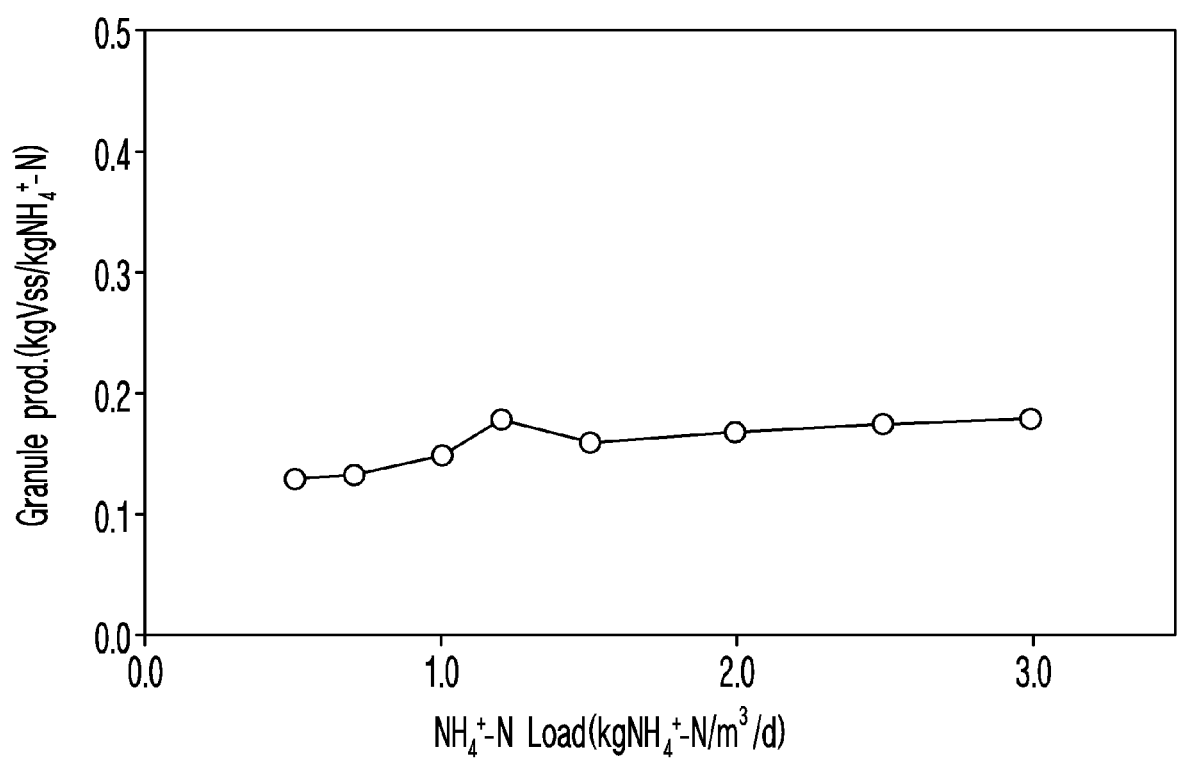
FIG. 6 is a graph illustrating the amount of AOB granules produced per ammonia removal amount under a nitrogen influx load condition in an AOB granulation tank according to an embodiment of the present invention.

FIG. 6 is a graph illustrating the amount of AOB granules produced per ammonia removal amount under a nitrogen influx load condition in an AOB granulation tank according to an embodiment of the present invention.

Referring to FIG. 6, as organic matter are mostly removed from the anaerobic digestion tank, the substrates available to the microorganisms exist mostly in the form of ammonia nitrogen. Thus, it can be shown that as autotrophic microorganisms spread and grow, 0.13 Kg to 0.18 Kg of OB granules, 0.16 Kg on the average, are produced for 1 Kg of influent ammonia nitrogen.

Experimental Example 2: Assess Variations in Microorganism Distribution Ratio in AOB Granulation Reactor To figure out variations in microorganism distribution ratio in an AOB granulation reactor, the amount and sequence listing of microorganisms and the community distribution of microorganisms in the AOB granules were identified using pyrosequencing analysis during the period of operation of the AOB granulation reactor of <Embodiment 3>.

Table 1 shows the types and distributions of microorganisms in the reactor.

TABLE 1

| Types and periods | Nitrosomonas SPP. | Nitrosospira SPP. | Nitrobacter SPP. |
|---|---|---|---|
| Early stage of operation | 1 ± 1.5% | 0.2 ± 0.3% | 3 ± 0.4% |
| 20 days of operation | 6 ± 3.0% | 2 ± 0.5% | 1.5 ± 1.3% |
| 60 days of operation | 23 ± 2.5% | 4 ± 0.5% | 0.5 ± 0.5% |

Referring to Table 1, Nitrosomonas SPP. which belong to the AOB increased from about 1% at the early stage of the operation to about 23% 60 days later the operation, and Nitrosospira SPP. increased from about 0.2% at the early stage of the operation to about 4% 60 days later.

In contrast, Nitrobacter SPP. which belong to the NOB decreased from about 3% at the early stage of the operation to about 0.5% 60 days later.

In other words, heterotrophic microorganisms grow very fast, thus forming low-density flocs.

Influenced by free ammonia (FA) which has a high concentration in the reaction tank, NOB become less active and are mostly washed out of the reactor, and AOB, which grow slow but are sedimented and left in the reactor despite quick sedimentation, have a strong and durable structure with relatively high density and form granules.

Thus, whereas the AOB distribution in the nitrification tank in the conventional active sludge process is 2% to 5% of all the microorganisms, the concentration of AOB according to the present invention is four times or more high as compared with the conventional active sludge. Further, use of AOB granules produced in the granule reactor increases nitritation efficiency in the same microorganism quantity by two to four times to the minimum as compared with the conventional active sludge process.

Processing high-concentration ammonia wastewater using the conventional active sludge process requires a high microorganism concentration, large reactor volume, and long retention time, consuming initial construction costs and lots of maintenance costs. Meanwhile, if high-concentration ammonia wastewater is treated using AOB granules produced in the AOB granulation reactor of the present invention, the amount of microorganisms required may be reduced by 30% or more and, despite the short retention time, the volume required may be reduced to a maximum of ¼.

Experimental Example 3: Assess Partial Nitritation in Main Process Using AOB Granules Partial nitritation was performed in the partial nitritation reaction tank 130 of <Embodiment 1> or <Embodiment 2> using AOB granules produced in the AOB granulation reactor of <Embodiment 3>.

The partial nitritation reaction tank 130 measures 2 m horizontally, 2 m in length, and 2.5 m in effective depth of water and may be made a block whose effective volume is 10 m³. The partial nitritation reaction tank 130 is operated in continuous flow and completed mixed forms.

organic matter are previously removed from the wastewater used for the experiment, and about 42 mg/L to about 49 mg/L of ammonia nitrogen are used. The daily treatment amount of wastewater is 220 m³/day, and the hydraulic retention time is about 1 hour.

1 to 2 mg/L of dissolved oxygen are retained as required for partial nitritation, and the dried AOB granule weight in the reactor remains about 3,000 mg/L.

Figure 7:
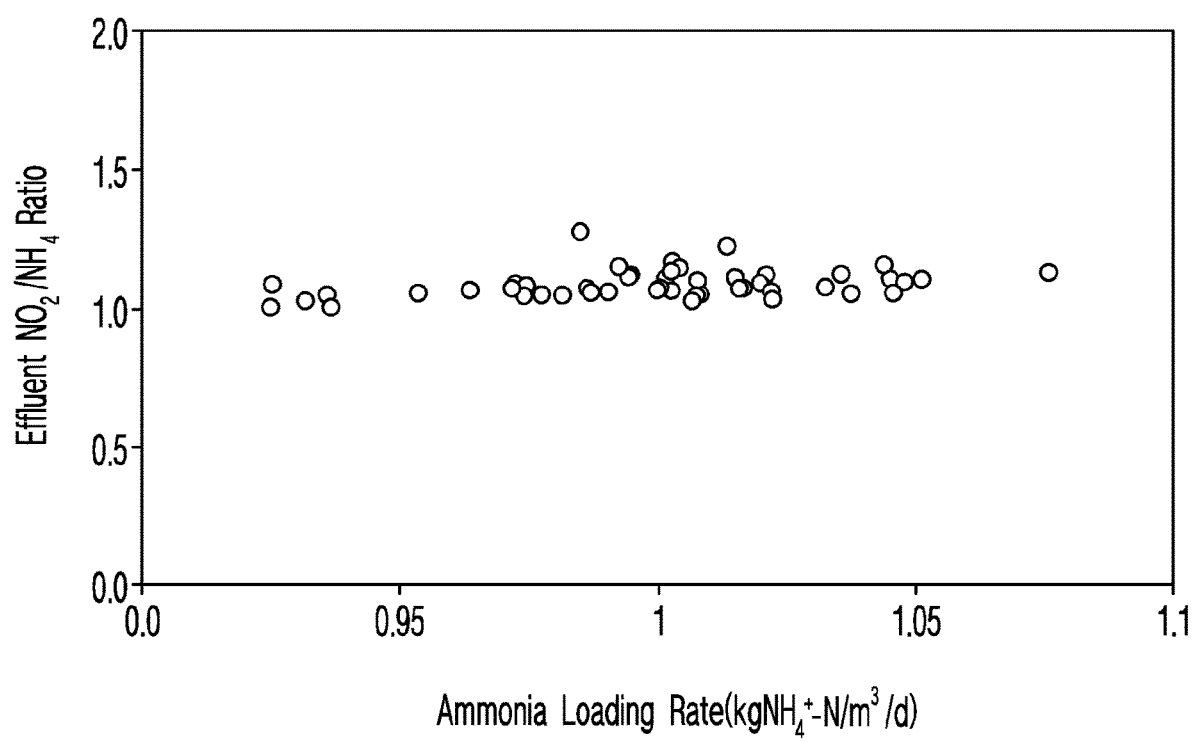
FIG. 7 is a graph illustrating a ratio of nitrite nitrogen to ammonia nitrogen in treated water in a nitrification reaction tank of a main treatment part according to an embodiment of the present invention.

FIG. 7 is a graph illustrating a ratio of nitrite nitrogen to ammonia nitrogen in treated water in a nitrification reaction tank of a main treatment part according to an embodiment of the present invention.

Referring to FIG. 7, as the ratio of nitrite nitrogen to ammonia nitrogen in the wastewater is 1:1 on the average as a result of the operation, it can be shown that partial nitritation has succeeded.

In particular, the activity of NOB remained low until part of the ammonia nitrogen is oxidized into nitrite nitrogen, and about 3 mg/L of nitrate nitrogen was produced.

In other words, since a high density of AOB exist in the granules, ammonia oxidizing was rapidly performed, and the subsequent step, i.e., nitrous oxidizing was not done due to the short retention time.

As a result of feeding an amount of oxygen necessary for partial nitritation to transform only half of the ammonia nitrogen into nitrite nitrogen, 5% or less of nitrate nitrogen was obtained. This save oxygen consumption by 60% as compared with full nitrification of ammonia nitrogen into nitrate nitrogen.

The activity lowering in NOB in the partial nitritation reaction tank 130 may be described as follows.

First, since the number of NOB is smaller than the number of AOB, the activity of NOB may be relatively low.

Second, in the distribution of nitrification microorganisms in granules, NOB are distributed mainly inside the granules as compared with AOB and, thus, NOB have a lower chance to use oxygen supplied from the outside of the granules than AOB.

Further, since NOB are lower in substrate affinity for oxygen than AOB and, as compared with AOB, are thus disadvantageous in competition for using oxygen under the same condition.

The nitrite accumulation property may be identified as the concentration of dissolved oxygen remains 2 mg/L or less. As set forth above, after ammonia is oxidized into nitric acid so that the oxidation of ammonia is complete, it is oxidized into nitrate nitrogen. Accordingly, the retention time of AOB in the reactor remains short, and as the amount of oxygen supplied to AOB is limited, ammonia may mostly transform into nitrite nitrogen.

Experimental Example 4: Assess ANAMMOX Process Using Partial Nitritation Treated Water in Main Process (The tester) assessed an ANAMMOX process using partial nitritation treated water.

The ANAMMOX reaction tank 150 of <Embodiment 1> or <Embodiment 2> was used.

The ANAMMOX reaction tank 150 may be configured as a circular reactor which measures 0.5 m in diameter, 3.7 m in effective depth of water, and 0.72 $m^3$ in effective volume. Floating media fills the upper portion of the ANAMMOX reaction tank 150 in the depth of 0.2 m to 0.3 m. The floating media may prevent leakage of AOB while simultaneously controlling the concentration of suspended materials in the discharged water.

As anaerobic AOB in the form of granules are positioned under the floating media, operation is performed, and the amount of microorganisms is configured to take up about 10% to about 20% of the volume of the reaction tank.

The reaction tank was operated in an upflow and fluidized form, and 75 days after the operation, the operation was performed with partial nitritation treated water injected.

Figure 8:
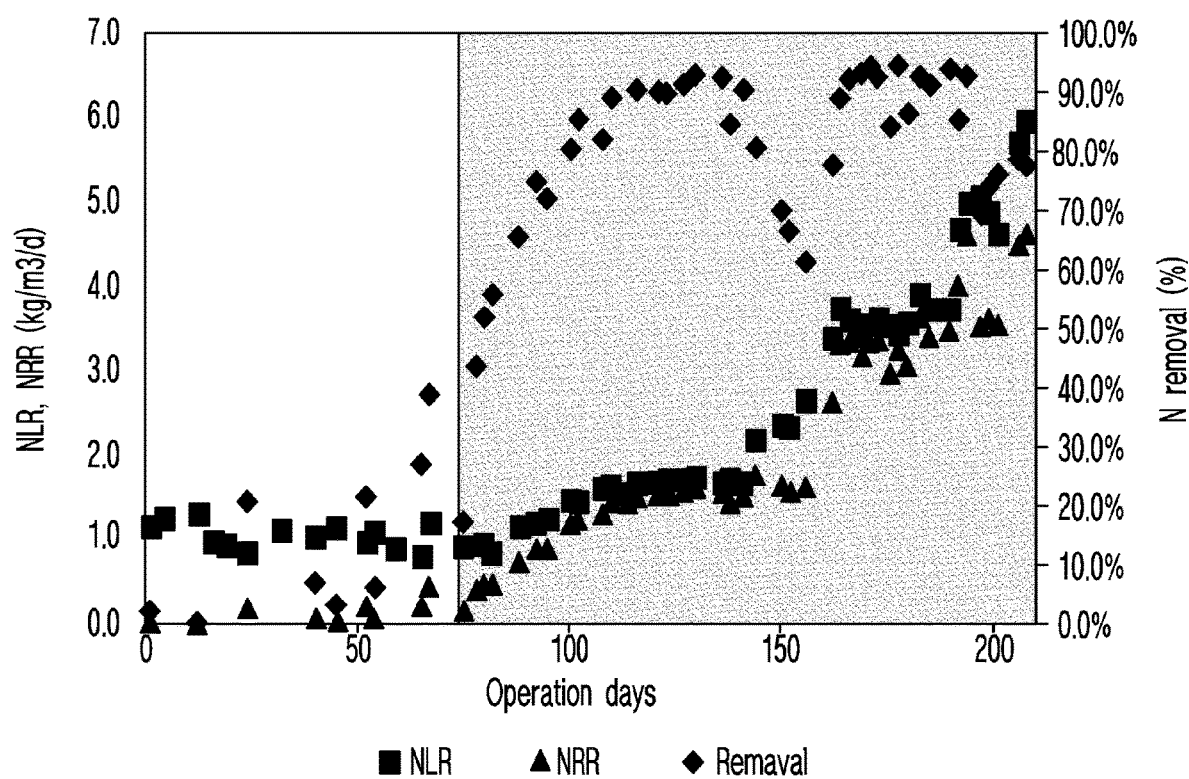
FIG. 8 is a graph illustrating the maximum nitrogen removal rate as per ANAMMOX reaction tank operation days using nitrified water in a main treatment part according to an embodiment of the present invention.

FIG. 8 is a graph illustrating the maximum nitrogen removal rate as per ANAMMOX reaction tank operation days using nitrified water in a main treatment part according to an embodiment of the present invention.

It may be identified from FIG. 8 that the removal rate of ANAMMOX process before partial nitritation was complete was very low and, as partial nitritation was then complete stepwise, nitrogen was removed.

(The tester) increased the nitrogen inflow load rate by gradually increasing the amount of inflow into the ANAMMOX reaction tank 150. As a result of the operation, it was identified that 90% or more of the influent nitrogen was removed and a maximum nitrogen removal rate (NRR) of 4.5 KgN/$m^3$/d was achieved.

As such, the treatment apparatus of the present invention may save oxygen consumption by 60% and organic matter necessary for denitrification by 100% by sufficiently performing partial nitritation on wastewater as compared with the conventional nitrification-denitrification process.

INDUSTRIAL AVAILABILITY

The present invention relates to a short-cut nitrogen removal wastewater treatment apparatus using an ANAMMOX process and partial nitritation using AOB granules. The present invention regards a short-cut nitrogen removal process which oxidizes only half of ammonia nitrogen up to the nitritation step and removing nitrogen using denitrification, thereby saving oxygen and organic matter consumption as compared with the conventional method and thus making it industrially applicable.

The invention claimed is:

1. A wastewater treatment apparatus, comprising:

a main treatment processing part including a first sedimentation tank for removing particulate organic matter of wastewater, a bio-reaction tank for removing dissolved organic matter of the first sedimented wastewater, and a second sedimentation tank for solid-liquid separating the organic matter-removed wastewater; and a sludge treatment processing part including a concentrating part to concentrate the solids separated in the first and second sedimentation tanks, an anaerobic digestion tank to anaerobically digest the concentrated solids, and a dehydrator to solid-liquid separate the solids anaerobically digested, wherein the main treatment processing part further includes a partial nitritation reaction tank using ammonium oxidation bacteria (AOB) granules, a granule recovery tank recovering granules in the partially nitritated wastewater, and an anaerobic ammonia oxidation (ANAMMOX) reaction tank, wherein the wastewater treatment apparatus comprises an AOB granulation tank reproducing granules reentered from the granule recovery tank into high-purity AOB granules, producing the AOB granules using a side stream from the dehydrator using an air lift-type reactor, and providing the AOB granules to the partial nitritation reaction tank included in the main treatment processing part, and wherein the side stream from the dehydrator is relatively high in concentration and temperature of ammonia nitrogen than in the main treatment processing part.

2. The wastewater treatment apparatus of claim 1, comprising another granule recovery tank, wherein the two granule recovery tanks separate the AOB granules into good granules and poor granules.

3. The wastewater treatment apparatus of claim 1, wherein the ANAMMOX reaction tank includes a sludge granule process or an biofilm process and is operated in an upflow and fluidized bed, and wherein an upper portion of the ANAMMOX reaction tank is filled with floating media to prevent leakage of anaerobic ammonium oxidation bacteria.

4. The wastewater treatment apparatus of claim 1, wherein the granules produced in the AOB granulation tank are recovered and stored in a storage tank and, when the partial nitritation reaction tank further included in the main treatment processing part is subjected to low efficiency, are supplied.

5. A wastewater treatment apparatus, comprising:
a main treatment processing part including a first sedimentation tank for removing particulate organic matter of wastewater, a bio-reaction tank for removing dissolved organic matter of the first sedimented wastewater, and a second sedimentation tank for solid-liquid separating the organic matter-removed wastewater; and
a sludge treatment processing part including a concentrating part to concentrate the solids separated in the first and second sedimentation tanks, an anaerobic digestion tank to anaerobically digest the concentrated solids, and a dehydrator to solid-liquid separate the solids anaerobically digested, wherein
the main treatment processing part further includes:
a partial nitritation reaction tank using AOB granules;
a granule recovery tank recovering granules in the partially nitritated wastewater; and
an ANAMMOX reaction tank, wherein
the wastewater treatment apparatus further comprises:
an AOB granulation tank reproducing granules reentered from the granule recovery tank into high-purity AOB granules, producing the AOB granules using a side stream from the dehydrator using an air lift-type reactor, and providing the produced AOB granules to the partial nitritation reaction tank included in the main treatment processing part; and
another ANAMMOX reaction tank, and wherein
the side stream from the dehydrator is relatively high in concentration and temperature of ammonia nitrogen than in the main treatment processing part.

6. The wastewater treatment apparatus of claim 5, wherein the ANAMMOX reaction tank for processing the side stream includes any one of a completed mixed or fluidized bed biofilm process.

7. The wastewater treatment apparatus of claim 6, wherein the fluidized bed biofilm process includes putting a fluidized bed carrier with a specific gravity of 0.94 to 0.96 and a specific surface area of 500 m2/m3 to 800 m2/m3 in 40 volume % to 50 volume % of the reaction tank, a stirrer for smooth fluidity of the fluidized bed carrier, and a non-powered buoyant discharger for preventing leakage of the carrier and bacteria.

8. The wastewater treatment apparatus of claim 5, wherein the ANAMMOX reaction tank includes a flotation-type solid separator to minimize influence by particulate matter discharged from the dehydrator, and wherein floating sludge is carried back to a front end of the dehydrator.

9. The wastewater treatment apparatus of claim 5, wherein a slope plate-type sedimentation tank is included between the granulation tank and the ANAMMOX reaction tank.

* * * * *